(12) United States Patent
Anderson et al.

(10) Patent No.: US 10,877,223 B2
(45) Date of Patent: Dec. 29, 2020

(54) END FACE CLEANING GEL FOR HARDENED MULTI-FIBER OPTICAL CONNECTORS; AND METHODS (71) Applicant: COMMSCOPE TECHNOLOGIES LLC, Hickory, NC (US)

(72) Inventors: David John Anderson, Bloomington, MN (US); David Thomas Brown, Bury St Edmunds (GB)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/329,481

(22) PCT Filed: Aug. 25, 2017

(86) PCT No.: PCT/US2017/048691
§ 371 (c)(1),
(2) Date: Feb. 28, 2019

(87) PCT Pub. No.: WO2018/044728
PCT Pub. Date: Mar. 8, 2018

(65) Prior Publication Data
US 2019/0258010 A1 Aug. 22, 2019

Related U.S. Application Data (60) Provisional application No. 62/382,512, filed on Sep. 1, 2016.

(51) Int. Cl.
*G02B 6/38* (2006.01)

(52) U.S. Cl.
CPC .......... *G02B 6/3866* (2013.01); *G02B 6/382* (2013.01); *G02B 6/3825* (2013.01); *G02B 6/3831* (2013.01); *G02B 6/3849* (2013.01); *G02B 6/3885* (2013.01)

(58) Field of Classification Search
CPC .... G02B 6/382; G02B 6/3866; G02B 6/3825; G02B 6/2849; G02B 6/3885
USPC .......................................................... 385/85
See application file for complete search history.

(56) References Cited

U.S. PATENT DOCUMENTS

| 5,214,730 A | 5/1993 | Nagasawa et al. |
| 6,579,014 B2 | 6/2003 | Melton et al. |
| 6,648,520 B2 | 11/2003 | McDonald et al. |
| 6,899,467 B2 | 5/2005 | McDonald et al. |
| 6,957,920 B2 | 10/2005 | Luther et al. |
| 7,264,402 B2 | 9/2007 | Theuerkorn et al. |

(Continued)

OTHER PUBLICATIONS

Extended European Search Report for European Patent Application No. 17847269.2 dated Feb. 27, 2020, 7 pages.

(Continued)

*Primary Examiner* — Akm E Ullah
(74) *Attorney, Agent, or Firm* — Merchant & Gould P.C.

(57) ABSTRACT

Aspects and techniques of the present disclosure relates generally to incorporating an index matching gel within a HMFOC such that as the HMFOC is mated, fiber tips protruding from multi-fiber ferrules of the HMFOC pass through the indexing matching gel to remove contaminates therefrom. The present disclosure also relates to a method of removing contaminates from optical fibers upon mating a hardened multi-fiber optical connector (HMFOC) with another HMFOC.

10 Claims, 8 Drawing Sheets

(56) References Cited

U.S. PATENT DOCUMENTS

| | | | |
|---|---|---|---|
| 7,744,286 B2 | 6/2010 | Lu et al. | |
| 7,744,288 B2 | 6/2010 | Lu et al. | |
| 7,762,726 B2 | 7/2010 | Lu et al. | |
| 7,942,590 B2 | 5/2011 | Lu et al. | |
| 7,959,361 B2 | 6/2011 | Lu et al. | |
| 8,740,474 B2 | 6/2014 | Lu | |
| 9,004,779 B2 * | 4/2015 | Horibe | G02B 6/3898 385/78 |
| 9,304,262 B2 | 4/2016 | Lu | |
| 9,557,498 B2 | 1/2017 | Loeffelholz | |
| 9,766,414 B2 | 9/2017 | Marcouiller et al. | |
| 10,261,264 B2 * | 4/2019 | Richmond | G02B 6/38 |
| 10,353,135 B2 * | 7/2019 | Song | G02F 1/13306 |
| 10,451,815 B2 * | 10/2019 | Flaig | G02B 6/3861 |
| 2014/0072265 A1 * | 3/2014 | Ott | G02B 6/4429 385/87 |
| 2014/0193124 A1 | 7/2014 | Bylander et al. | |
| 2014/0254986 A1 | 9/2014 | Kmit et al. | |
| 2015/0063759 A1 * | 3/2015 | Barnette, Jr. | G02B 6/3849 385/78 |
| 2015/0378109 A1 | 12/2015 | Samal et al. | |
| 2015/0378112 A1 * | 12/2015 | Marcouiller | G02B 6/3879 385/56 |
| 2016/0041344 A1 * | 2/2016 | Wasserbauer | G02B 6/3885 385/78 |

OTHER PUBLICATIONS

International Search Report and Written Opinion of the International Searching Authority for International Patent Application No. PCT/US2017/048691 dated Dec. 8, 2017, 13 pages.

\* cited by examiner

END FACE CLEANING GEL FOR HARDENED MULTI-FIBER OPTICAL CONNECTORS; AND METHODS

CROSS-REFERENCE TO RELATED APPLICATION

This application is a National Stage Application of PCT/US2017/048691, filed on Aug. 25, 2017, which claims the benefit of U.S. Patent Application Ser. No. 62/382,512, filed on Sep. 1, 2016, the disclosures of which are incorporated herein by reference in their entireties. To the extent appropriate, a claim of priority is made to each of the above disclosed applications.

TECHNICAL FIELD

The present disclosure relates generally to optical fiber communication systems. More particularly, the present disclosure relates to hardened multi-fiber optical connectors and methods of cleaning.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Fiber optic connectors are an important part of most fiber optic communication systems. Fiber optic connectors allow optical fibers to be quickly optically connected without requiring a splice. Fiber optic connectors can include single fiber connectors and multi-fiber connectors.

A typical fiber optic connector includes a ferrule assembly supported at a distal end of a connector housing. The ferrule assembly can include a multi-fiber ferrule mounted in a hub. A spring is used to bias the ferrule assembly in a distal direction relative to the connector housing. The multi-fiber ferrule functions to support the end portions of multiple optical fibers. The multi-fiber ferrule has a distal end face at which polished ends of the optical fibers are located. When two multi-fiber fiber optic connectors are interconnected, the distal end faces of the multi-fiber ferrules oppose and are biased toward one another by their respective springs. With the multi-fiber fiber optic connectors connected, their respective optical fibers are coaxially aligned such that the end faces of the optical fibers directly oppose one another. In this way, optical signals can be transmitted from optical fiber to optical fiber through the aligned end faces of the optical fibers.

As indicated above, multi-fiber ferrules are configured for supporting the ends of multiple optical fibers. Typically, the optical fibers are arranged in one or more rows within the multi-fiber ferrule. When two multi-fiber ferrules are interconnected, the fibers of the rows of optical fibers align with one another. For most multi-fiber ferrules, it is desirable for the optical fibers to protrude distally outwardly from the distal end faces of the multi-fiber ferrules. This type of protrusion can assist in making physical fiber-to-fiber contact when two multi-fiber connectors are mated. U.S. Pat. No. 6,957,920, which is hereby incorporated by reference in its entirety, discloses a multi-fiber ferrule having protruding optical fibers of the type described above.

Contamination and defects on the end face of a fiber optical connector and subsequently the bare fiber is a major concern that can degrade the performance of the connector. For example, dust particles can greatly impact the performance of the connector. Accordingly, connectors are often transported and stored with end caps or dust covers that are designed to shield the end face of the connector ferrule. However, even with a dust cover, connectors may still become contaminated with particulates and need to be subsequently cleaned. For example, particles from the interior of the dust cap may migrate to the end face of the ferrule of the connector.

While structures such as dust caps have been used in the prior art to protect the polished end faces of optical fibers, improvements are desirable in this area.

SUMMARY

One aspect of the present disclosure relates to a multi-fiber optical connector assembly. The multi-fiber optical connector assembly can include a hardened multi-fiber optic connector comprising a multi-fiber ferrule. The multi-fiber ferrule can support a plurality of optical fibers that extend therethrough to a distal end face of the multi-fiber ferrule. The multi-fiber optical connector assembly can also include a gel that covers the plurality of optical fibers of the multi-fiber ferrule and an adapter for securing the hardened multi-fiber optic connector to another hardened multi-fiber optic connector. As the two hardened multi-fiber optic connectors are being mated, the plurality of optical fibers pass through the gel such that the gel removes contaminates from the plurality of optical fibers prior to mating the two hardened multi-fiber optic connectors.

Another aspect of the present disclosure relates to a method of removing contaminates from an end face of a multi-fiber ferrule optical connector having a multi-fiber ferrule assembly. The multi-fiber ferrule assembly can include a multi-fiber ferrule that has an end face that defines a plurality of fiber openings arranged in a central region of the end face. The multi-fiber ferrule optical connector can also include first and second alignment structures that can be disposed at opposite sides of the central region. The multi-fiber ferrule can hold a plurality of optical fibers that have fiber tips that protrude from respective alignment holes defined by the end face. The method can include a step of applying a gel to cover the plurality of fiber openings in the central region of the multi-fiber ferrule between the first and second alignment structures. The method can further include a step of removing contaminates from the fiber tips passing through the gel as the multi-fiber ferrule optical connector is mated with another multi-fiber ferrule optical connector.

A further aspect of the present disclosure relates to a multi-fiber optical connector assembly that can include a fiber optic cable terminated by a fiber optic connector arrangement. The fiber optic connector arrangement can include a first hardened multi-fiber optic connector that has a connector housing. The connector housing can have an end that defines a plug portion. The fiber optic connector arrangement can also include a multi-fiber ferrule assembly mounted at least partially within the connector housing. The multi-fiber ferrule assembly can include a multi-fiber ferrule located at the plug portion of the connector housing. The multi-fiber ferrule can have an end face that defines a plurality of fiber openings arranged in a central region of the end face. First and second alignment structures can be disposed at opposite sides of the central region. The multi-fiber ferrule can hold a plurality of optical fibers that each has fiber tips that protrude from respective fiber openings defined by the end face. The fiber optic connector arrangement can further include a main sleeve body that mounts over a rear portion of the multi-fiber ferrule assembly and a fastener that mounts over the main sleeve body for securing the first hardened multi-fiber optic connector to a second hardened fiber optic connector. A gel positioned at the end face of the multi-fiber ferrule to cover the fiber tips such that the fiber tips are embedded in the central region of the multi-fiber ferrule between the first and second alignment structures. The fiber tips of the plurality of optical fibers pass through the gel as the first and second hardened fiber optic connectors are mated together. The gel removes contaminates from the fiber tips of the plurality of optical fibers as the fiber tips move through the gel prior to mating the first and second hardened fiber optic connectors together.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

The present disclosure relates generally to incorporating an index matching gel within a HMFOC such that as the HMFOC is mated, fiber tips protruding from multi-fiber ferrules of the HMFOC pass through the indexing matching gel to remove contaminates therefrom. The present disclosure also relates to a method of removing contaminates from optical fibers upon mating a hardened multi-fiber optical connector (HMFOC) with another HMFOC.

Fiber optic connectors can include ferrules supporting single optical fibers (i.e., single-fiber ferrules corresponding to single-fiber connectors) and can also include ferrules supporting multiple optical fibers (i.e., multiple-fiber ferrules corresponding to multiple-fiber connectors). One example of an existing single-fiber fiber optic connection system is described at U.S. Pat. Nos. 6,579,014; 6,648,520; and 6,899,467, which are hereby incorporated by reference in their entireties. An example of a multi-fiber connection system is disclosed at U.S. Pat. Nos. 5,214,730 and 9,304,262, the disclosures of which are hereby incorporated herein by reference in their entireties.

Figure 1:
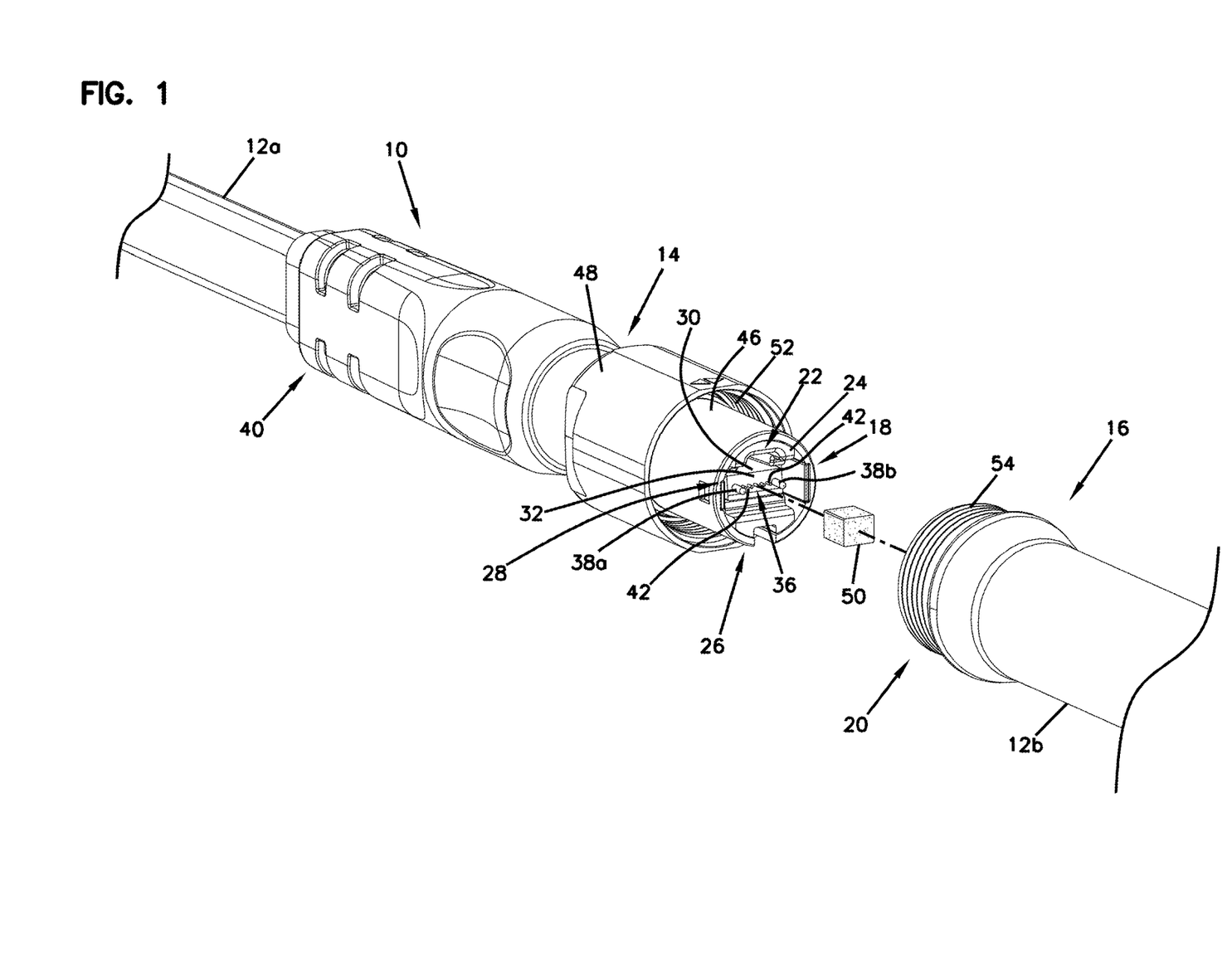
FIG. 1 is a front perspective view of an example multi-fiber optical connector assembly including a fiber optic cable terminated by a multi-fiber optic connector arrangement having a gel in accordance with principles of the present disclosure.

FIG. 1 illustrates an example first multi-fiber optical connector assembly 10 including a fiber optic cable 12a terminated by a fiber optic connector arrangement 14 and a second multi-fiber optical connector assembly 16 including a fiber optic cable 12b. In accordance with some aspects, the fiber optic connector arrangement 14 may be hardened so that a ruggedized connection can be made between the fiber optic connector arrangement 14 and an enclosure (e.g., a fiber optic adapter) or another connector.

As the term is used herein, a connection is "ruggedized" when the optical connector arrangement 14 is configured to be environmentally sealed and robustly connected with the enclosure or other connector.

As the term is used herein, a "robust connection" refers to a connection of an optical connector arrangement 14 to the enclosure or other connector such that the optical connector arrangement 14 can withstand an axial load of at least 50 pounds without pulling away from the enclosure or other connector. In certain examples, a robust connection structure includes twist-to-lock connections. In an example, a twist-to-lock connection includes a bayonet connection. In another example, a twist-to-lock connection includes a threaded connection. Some non-limiting example ruggedized optical connector interfaces suitable for use with an indexing terminal are disclosed in U.S. Pat. Nos. 7,744,288; 7,762,726; 7,744,286; 7,942,510; and 7,959,361, the disclosures of which are hereby incorporated herein by reference.

The fiber optical cables 12a, 12b can be sealed to its respective multi-fiber optical connector assembly 10, 16. In one example, the sealing between the fiber optical cables 12a, 12b and the respective multi-fiber optical connector assembly 10, 16 can be accomplished using radial seals and/or axial seals. For example, a heat recoverable sleeve can be applied over the fiber optical cables 12a, 12b and over a portion of the multi-fiber optical connector assembly 10, 16. In other examples, a gasket or other sealing member can be disposed between the fiber optical cables 12a, 12b and the multi-fiber optical connector assembly 10, 16 to provide an environmental seal. In certain examples, a strain-relief boot 40 can be used to provide side load strain relief to the fiber optical cables 12a, 12b.

The fiber optic connector arrangement 14 of the first multi-fiber optical connector assembly 10 may include a multi-fiber connection interface, such as, but not limited to, a first hardened multi-fiber optic connector 18. It will be appreciated that the multi-fiber connection interface may be a port within a housing or a male or female fiber optic connector. In the example shown, the first hardened multi-fiber optic connector 18 is a male connector. The second multi-fiber optical connector assembly 16 can include a second hardened multi-fiber optic connector 20 that is a female connector. The male and female connectors can be adapted to be coupled together.

Although the first hardened multi-fiber optic connector 18 will be described, it will be appreciated that the same can be said of the second hardened multi-fiber optic connector 20. In certain examples, the second hardened multi-fiber optic connector 20 can be incorporated into a Multiport Service Terminal (MST) as will be described with reference to FIGS. 4-7.

In one example, the first hardened multi-fiber optic connector 18 includes a connector housing 22 that has an end 24 defining a plug portion 26 and a multi-fiber ferrule assembly 28 mounted at least partially within the connector housing 22. The multi-fiber ferrule assembly 28 includes a multi-fiber ferrule 30 located at the plug portion 26 of the connector housing 22.

The multi-fiber ferrule 30 has an end face 32 that defines a plurality of fiber openings 34 (see FIG. 3) arranged in a central region 36 of the end face 32. First and second alignment structures 38a, 38b are disposed at opposite sides of the central region 36. The first and second alignment structures 38a, 38b can aid in aligning the first hardened multi-fiber optic connector 18 with the second hardened multi-fiber optic connector 20. In some examples, the first and second alignment structures 38a, 38b can include guide pins. In one example, the second hardened multi-fiber optic connector 20 can be arranged with first and second alignment holes (not shown) to receive the first and second alignment structures 38a, 38b. In certain examples, the first and second alignment structures 38a, 38b can be either an alignment pin or an alignment hole. In still other examples, each first and second hardened multi-fiber optic connector 18, 20 can include one guide pin and one guide hole. In certain examples, the first and second hardened multi-fiber optic connectors 18, 20 can be keyed to indicate a desired rotational orientation and/or the polarity of the optical fibers.

The multi-fiber ferrule 30 can hold a plurality of optical fibers 42 that each have fiber tips 44 (see FIG. 3) that protrude from respective fiber openings 34 defined by the end face 32. In one example, the fiber tips 44 may extend from about 1 micron to about 20 microns past the end face 32. In other examples, the fiber tips 44 may extend from about 3 microns to about 15 microns past the end face 32. In certain examples, the fiber tips 44 may extend about 8 microns past the end face 32. In one example, the fiber tips 44 may extend about 10 microns past the end face 32. In some examples, the fiber tips 44 are laser cleaved. In other implementations, the fiber tips 44 are formed using laser grinding. An example laser grinding process can be found in U.S. Pat. No. 8,740,474, the disclosure of which is incorporated herein by reference.

In one example, the plurality of optical fibers 42 can extend from the fiber optical cable 12a to the multi-fiber ferrule 30. In some examples, the plurality of optical fibers 42 is ribbonized within the plurality of optical fibers 42. In certain examples, the plurality of optical fibers 42 are separated from each other as the plurality of optical fibers 42 are transitioned between the plurality of optical fibers 42 and the multi-fiber ferrule 30.

In one example, the plurality of optical fibers 42 can be arranged in a row that extends along the end face 32. In some aspects there may be multiple rows of fibers. Example optical fibers 42 include material (e.g., a glass core surrounded by a glass cladding layer) that transmits optical information/signals.

In one example, the multi-fiber ferrule 30 is configured to hold at least about twelve optical fibers 42. The twelve optical fibers 42 can extend from the fiber optical cable 12a to the multi-fiber ferrule 30. The twelve optical fibers 42 may be arranged in a single row in the multi-fiber ferrule 30.

In other examples, the multi-fiber ferrule 30 is configured to hold at least about twenty four optical fibers 42. The twenty four optical fibers 42 can extend from the fiber optical cable 12a to the multi-fiber ferrule 30. The twenty four optical fibers 42 may be arranged in two rows in the multi-fiber ferrule 30. In certain examples, there may be multiple multi-fiber ferrules 30 that can be configured to hold greater than twenty four optical fibers 42. In FIG. 1, five optical fibers 42 from a first row of the fiber ribbon are shown extending to the multi-fiber ferrule 30.

The fiber optic connector arrangement 14 can also include a main sleeve body 46 mounted over a rear portion of the ferrule assembly 28. A fastener 48 can be mounted over the main sleeve body 46 for securing the first hardened multi-fiber optic connector 18 to the second hardened fiber optic connector 20. In one example, the fastener 48 can be a twist-to-lock fastener that includes an internal threaded surface 52 to engage an external threaded surface 54 of the second hardened fiber optic connector 20, although alternatives are possible. When ferrules of the coupled (i.e., mated) connectors 18, 20 are together, optical fibers supported by the female ferrule are optically coupled to corresponding optical fibers supported by the male ferrule.

Figure 2:
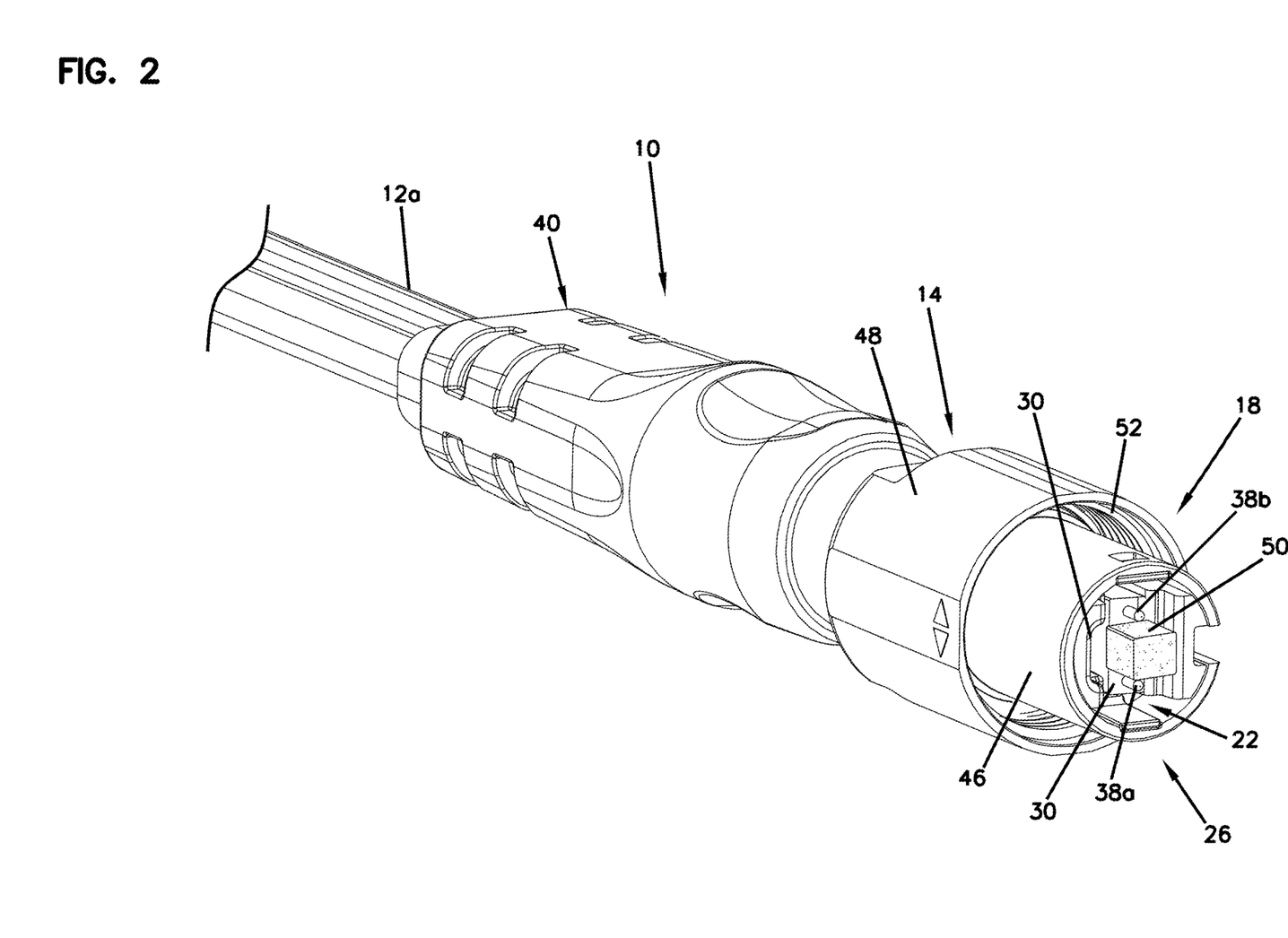
FIG. 2 is a front perspective view of the multi-fiber optical connector arrangement with the gel in place in accordance with the principles of the present disclosure.

Referring still to FIG. 1, an example index matching gel 50 can be arranged and configured between the two connectors 18, 20. In one example, the gel 50 can be initially attached to the male connector 18 as shown in FIG. 2. In other examples, the gel 50 can be initially attached to the female connector 20. In certain examples, the gel 50 may be mounted on ferrules of both the male and female connectors 18, 20.

Figure 3:
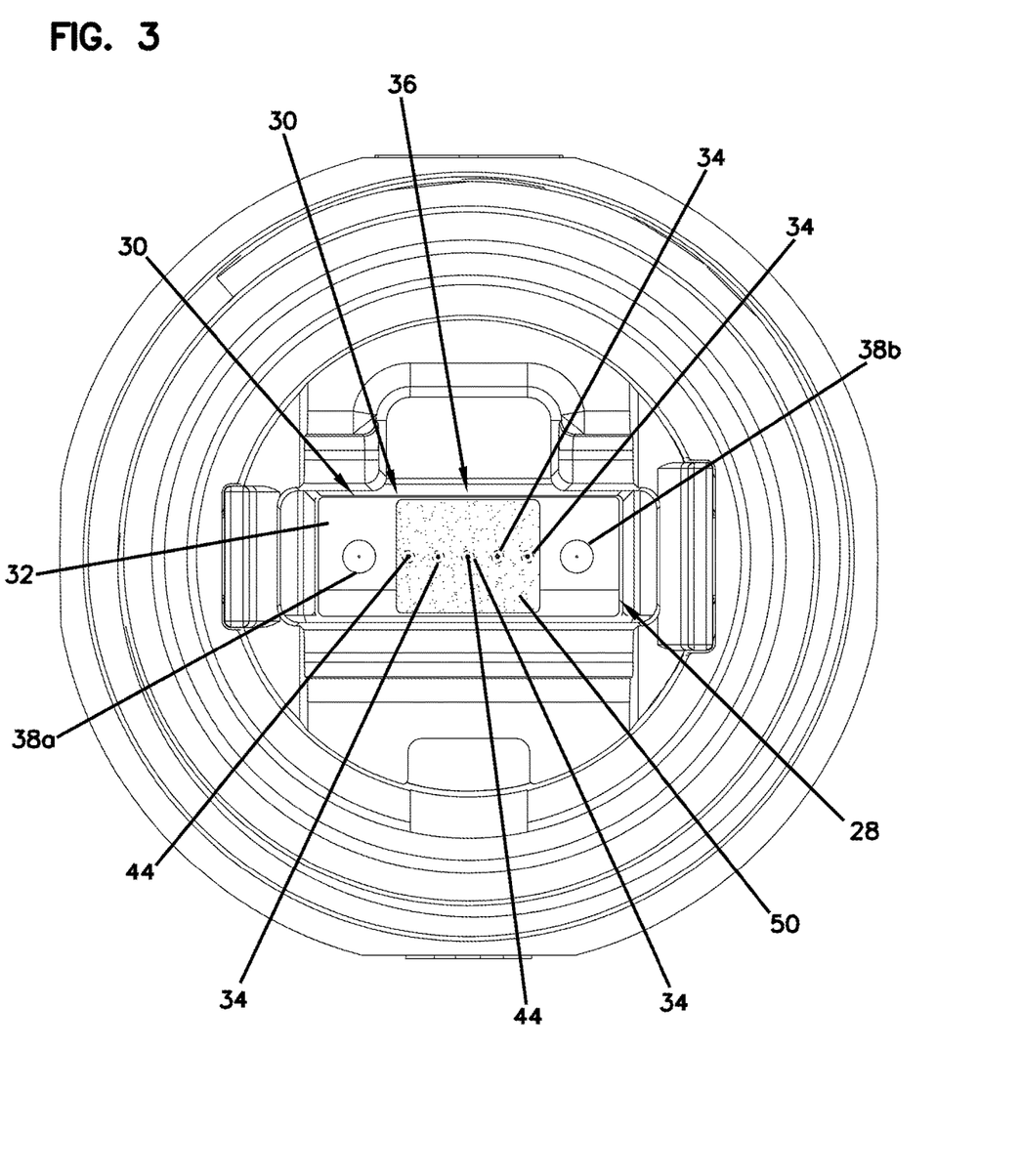
FIG. 3 is an end view of the multi-fiber optical connector arrangement shown in FIG. 2.

As depicted in FIGS. 2 and 3, the gel 50 can be arranged and configured on the end face 32 of the multi-fiber ferrule 30 to cover the fiber tips such that the fiber tips 44 are embedded in the gel 50 at the central region 36 of the multi-fiber ferrule 30 between the first and second alignment structures 38a, 38b. A variety of techniques may be used to attach or retain the gel 50 in the connectors 18, 20 such that the gel 50 covers fiber ends during the process of mating the two connectors 18, 20.

The gel 50 acts as a lubricant to remove contaminates off of the fiber tips 44 of the optical fibers 42 when coupling (e.g., mating) of the two connectors 18, 20 occurs. For example, the fiber tips 44 of both the connectors 18, 20 can pass through the gel 50 as the two connectors 18, 20 are coupled together. When the fiber tips 44 of both connectors 18, 20 pass through the gel 50; the fiber tips 44 can be cleaned of any unwanted material or contaminates, such as, but not limited to, dust, sand or any other debris. Thus, the gel 50 cleans the fiber tips 44 of the optical fibers 42 prior to the two connectors 18, 20 making contact or coupling. As a result, all of the fiber tips 44 of the optical fibers 42 arranged in the connectors 18, 20 can be cleaned at the same time.

The act of mating the two connectors squeezes the gel 50 between the fiber end faces 32. For example, the gel 50 can be dispersed within the connector housing 22 of at least one of the first and second hardened multi-fiber optical connectors 18, 20 when coupled together. One advantage of the present disclosure is for the purpose of eliminating cleaning of connectors in the field prior to mating. In certain examples, the gel 50 can be shipped with a connector and retained in a connector housing.

The fiber optic connector arrangement 14 can also include a dust cap 68a (see FIG. 8) that may be mounted on the multi-fiber ferrule 30. The dust cap 68a can have an open end 114 and an opposite closed end 116. In one example, the gel 50 may be contained within the dust cap 68a during shipping such that the closed end 116 opposes the gel 50 to secure the gel 50 in place on the fiber end face 32. As the dust cap is removed, the gel 50 remains on the fiber end face 32. When the first and second hardened multi-fiber optic connectors 18, 20 are coupled together, the gel 50 can be compressed between the two multi-fiber ferrules of both the first and second hardened multi-fiber optic connectors 18, 20. In certain examples, the gel 50 is press fit within the connector housing 22 (e.g., body) of the first and second hardened multi-fiber optic connectors 18, 20. It will be appreciated that after several subsequent matings, the effectiveness of the gel 50 may diminish. As a result, the gel 50 may be replaced in the field for any connectors that require it. Typically, a HMFOC connector is only mated one or twice in is lifetime, thus, making any replacements a rare occasion.

It will be appreciated that the gel of the present disclosure may be formed of any one or more of a variety of materials. In one example, polymeric foam (e.g., open cell or closed cell) such as silicone foam can be used. In still other examples, the gel may be combined with another material such as an elastomer. The gel may, for example, comprise silicone gel, urea gel, urethane gel, thermoplastic gel, or any suitable gel or geloid sealing material. Example gels include oil-extended polymers. The polymer may, for example, comprise an elastomer, or a block copolymer having relatively hard blocks and relatively elastomeric blocks. Example copolymers include styrene-butadiene or styrene-isoprene di-block or tri-block copolymers. In still other examples, the polymer of the gel may include one or more styrene-ethylene-propylene-styrene block copolymers. Example extender oils used in example gels may, for example, be hydrocarbon oils (e.g., paraffinic or naphthenic oils or polypropene oils, or mixtures thereof). The gel can also include additives such as moisture scavengers, antioxidants, tackifiers, pigments and/or fungicides.

In one example, it is not necessary that the first and second hardened multi-fiber optic connectors 18, 20 rely on the gel 50 for optical performance because the fiber end face geometry will assure physical contact of the fiber ends. Rather, the gel 50 can act as a cleaning agent to wipe any contaminates off fiber end faces during the act of compression of the two ferrules together.

In other examples, the gel 50 may be used to improve the optical connection between the open light transmission paths of the optical fibers. The index matching gel can have an index of refraction that closely approximates that of an optical fiber is used to reduce Fresnel reflection at the surface of the bare optical fiber ends.

The present disclosure also relates to a method of removing contaminates from an end face 32 of a multi-fiber ferrule optical connector 18. The method can include a step of applying the gel 50 to the end face 32 of the multi-fiber ferrule 30 to cover the fiber tips 44 such that the fiber tips 44 are embedded in the gel 50 at the central region 36 of the multi-fiber ferrule 30 between the first and second alignment structures 38a, 38b. The method can also include a step of removing contaminates from the fiber tips 44 passing through the gel 50 as the multi-fiber ferrule optical connector 18 is mated with another multi-fiber ferrule optical connector (e.g., second multi-fiber optical connector). The method can further include a step of mounting a dust cap on the multi-fiber ferrule optical connector 18. The dust cap is arranged and configured to not engage or contact the gel 50 when mounted. The dust cap can be removed from the multi-fiber ferrule optical connector 18 without removing the gel 50 from the end face 32.

Figure 4:
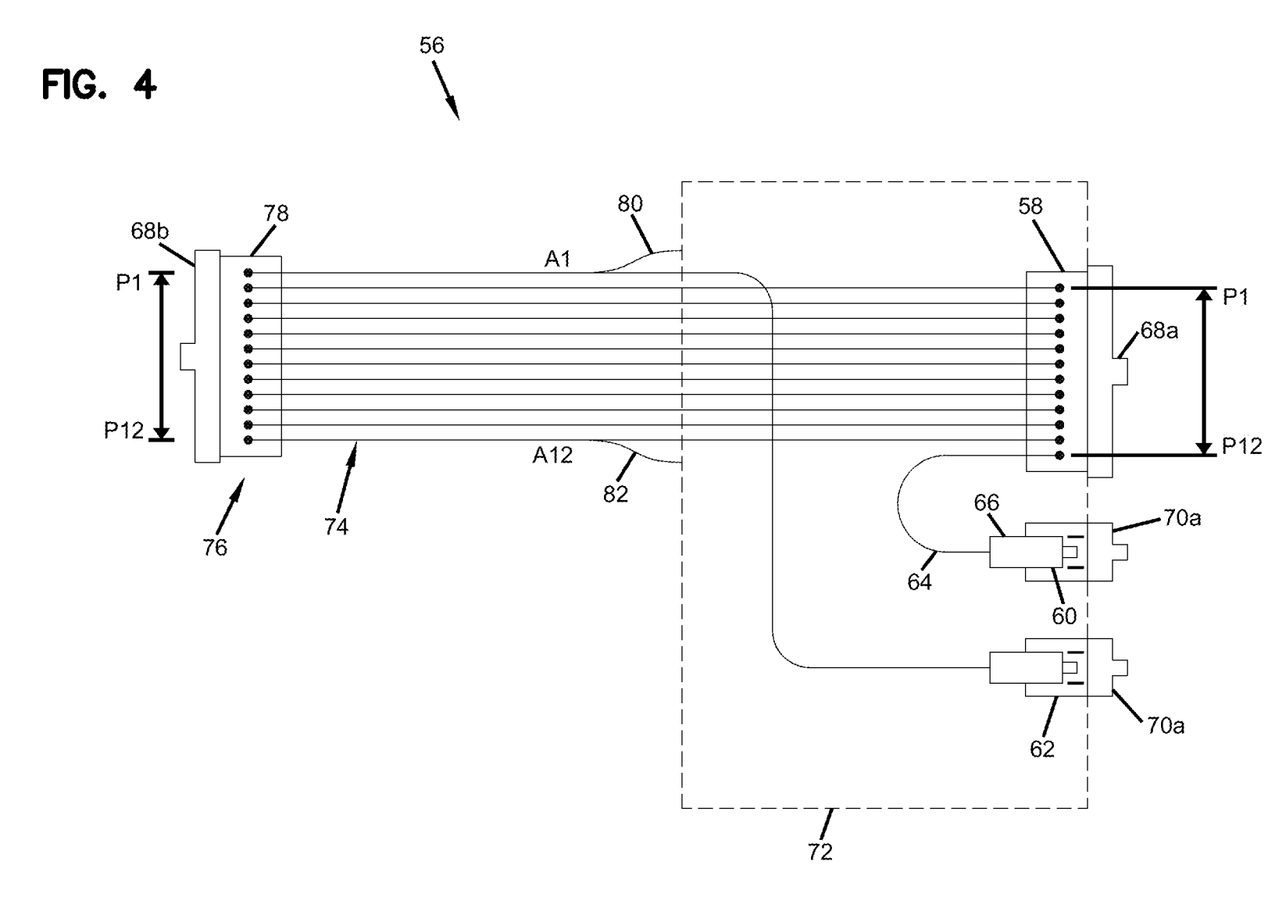
FIG. 4 is a schematic of an indexing terminal in accordance with the principles of the present disclosure.

FIG. 4 illustrates an indexing terminal 56 in accordance with the principles of the present disclosure suitable for supporting a bidirectional indexing architecture. An example bidirectional indexing architecture can be found in U.S. patent application Ser. No. 14/755,380, filed on Jun. 30, 2015, the disclosure of which is incorporated herein by reference in its entirety. The indexing terminal 56 includes a multi-fiber ruggedized de-matable connection location 58, a first single-fiber ruggedized de-matable connection location 60 and a second single-fiber ruggedized de-mateable connection location 62. The multi-fiber ruggedized de-mateable connection location 60 includes a plurality of fiber positions labeled P1-P12. One of the fiber positions P1-P12 is coupled to the first single-fiber ruggedized de-mateable connection location 60. For example, as shown at FIG. 4, the fiber position P12 is optically connected to the first single-fiber ruggedized de-mateable connection location 60 by an optical pigtail 64 terminated by a non-ruggedized fiber optic connector 66 that connects to the first single-fiber ruggedized de-mateable connection location 60.

In certain examples, the multi-fiber ruggedized de-mateable connection location 58 is an HMFOC adapter of the type disclosed at U.S. Pat. No. 7,264,402, which is hereby incorporated by reference in its entirety. The dust cap 68a can be used to close an exterior port of the multi-fiber ruggedized de-mateable connection location 58 when a corresponding multi-fiber ruggedized connector is not received therein. The first and second single-fiber ruggedized de-mateable connection locations 60, 62 can be defined by ruggedized, single-fiber adapters of the type disclosed at U.S. Pat. No. 7,959,361, which is hereby incorporated by reference in its entirety. Dust caps 70a can be used to enclose exterior ports of the first and second single-fiber ruggedized de-mateable connection locations 60, 62 when corresponding ruggedized single-fiber connectors (e.g., ruggedized single-fiber connectors 110, shown at FIGS. 6 and 7, having dust caps 70b) are not received therein. The dust caps 70a, 70b can have coordinated/matching indicia. The connectors 110 can terminate the ends of fiber optic cables 112 (see FIGS. 6 and 7). In certain examples, the indexing terminal 56 can include a housing 72 on which the multi-fiber ruggedized de-mateable connection location 58, the first single-fiber ruggedized de-mateable connection location 60 and the second single-fiber ruggedized de-mateable connection location 62 are provided. In certain examples, the housing 72 can have a polymeric (e.g., plastic) construction that is relatively rigid in nature. In certain examples, housing 72 can be environmentally sealed and suitable for outdoor use.

Referring still to FIG. 4, the indexing terminal 56 further includes a tether 74 having a first end 76 terminated by a ruggedized multi-fiber optical connector 78 (e.g., an HMFOC connector). The ruggedized multi-fiber optical connector 78 has a plurality of fiber positions labeled P1-P12. One of the fiber positions is optically coupled to the second single-fiber ruggedized de-mateable connection location 62. Others of the fiber positions P1-P12 of the ruggedized multi-fiber optical connector 78 are optically coupled to the multi-fiber ruggedized de-mateable connection location 58. The plurality of fiber lines A1-A12 are provided for making such optical connections. For example, in the depicted embodiment, fiber line A1 optically connects position P1 of the ruggedized multi-fiber optical connector 78 to the second single-fiber ruggedized de-mateable connection location 62.

In one example, the fiber line A1 can be a connectorized pigtail having an end terminated by a non-ruggedized fiber optic connector (e.g., an SC-type connector) that is inserted into an interior port of the second non-fiber ruggedized de-mateable connection location 62. The fiber lines A2-A12 are shown optically connecting the ruggedized multi-fiber optical connector 78 to the multi-fiber ruggedized de-mateable connection location 58. The fiber lines A2-A12 are indexed such that the fiber lines A2-A12 are connected to different fiber positions at the ruggedized multi-fiber optical connector 78 as compared to at the multi-fiber ruggedized de-mateable connection location 58. For example, the fiber lines A2-A12 are shown indexed one position so as to be respectively coupled to positions P1-P11 of the multi-fiber ruggedized de-mateable connection location 58.

In certain examples, the ruggedized multi-fiber optical connector 78 includes a dust cap 68b for protecting a ferrule and/or fiber end faces of the connector 78 when the ruggedized multi-fiber optical connector 78 is de-mated from another connector. The dust caps 68a, 68b can have coordinated/matching indicia. Similar to the connectors 18, 20, the gel 50 can be positioned on the fiber end faces of the connector 78 such that the fiber end faces are embedded therein. The dust cap 68b may also be used to secure the gel 50, as described with reference to FIG. 8 below.

In certain examples, the tether 74 is a stub cable that interfaces with the housing 72 of the indexing terminal 56 at a pass-through location 80. In certain examples, a boot 82 can be provided at the pass-through location 80 for providing strain relief and other reinforcement to the tether 74. In certain examples, the tether 74 is a relatively short stub that can be less than 2 feet or less than 1 foot in length. In such examples, the indexing terminal 56 can be daisy chained to a leg terminal by a patch cord of extended length having a first ruggedized multi-fiber connector that mates with the ruggedized multi-fiber optical connector 78 and a second ruggedized multi-fiber connector that mates with the multi-fiber ruggedized de-mateable connection location 58 of the like indexing terminal. In other embodiments, the stub cable formed by the tether 74 can be relatively long (e.g., more than 500 feet or more than 1,000 feet in length). In such examples, the indexing terminal 56 can be coupled to a like indexing terminal by directly mating the ruggedized multi-fiber optical connector 78 with the multi-fiber ruggedized de-mateable connection location 58 of the like indexing terminal.

In alternative embodiments, the pass-through location 80 described above can be replaced with a multi-fiber ruggedized de-mateable connection location similar to the multi-fiber ruggedized de-mateable connection location 58. In this type of example, an extended patch cord having opposite ends terminated by ruggedized multi-fiber optical connectors can be used to couple the indexing terminal to a like terminal.

As the terms are used herein, ruggedized optical connectors and ruggedized optical adapters are configured to mate together to form an environmental seal. Some non-limiting example ruggedized optical connector interfaces suitable for use with an indexing terminal are disclosed in U.S. Pat. Nos. 7,744,288, 7,762,726, 7,744,286, 7,942,590, and 7,959,361, the disclosures of which are hereby incorporated herein by reference in their entireties.

The terminals can include hardened/ruggedized multi-fiber optical connectors (HMFOC). HMFOC's can include environmental seals for sealing the connectors in outside environments. HMFOC's can include fasteners such as threaded or bayonet-style fasteners for providing robust connector-to connector mechanical connections. HMFOC's can include male connectors on cables, female connectors on cables, ports/adapters on housings and other structures. HMFOC's can include multi-fiber ferrules including fiber receiving arrangements defining a plurality of fiber receiving positions. In certain examples, the fiber receiving positions can be arranged in one or more rows of fiber receiving positions.

Figure 5:
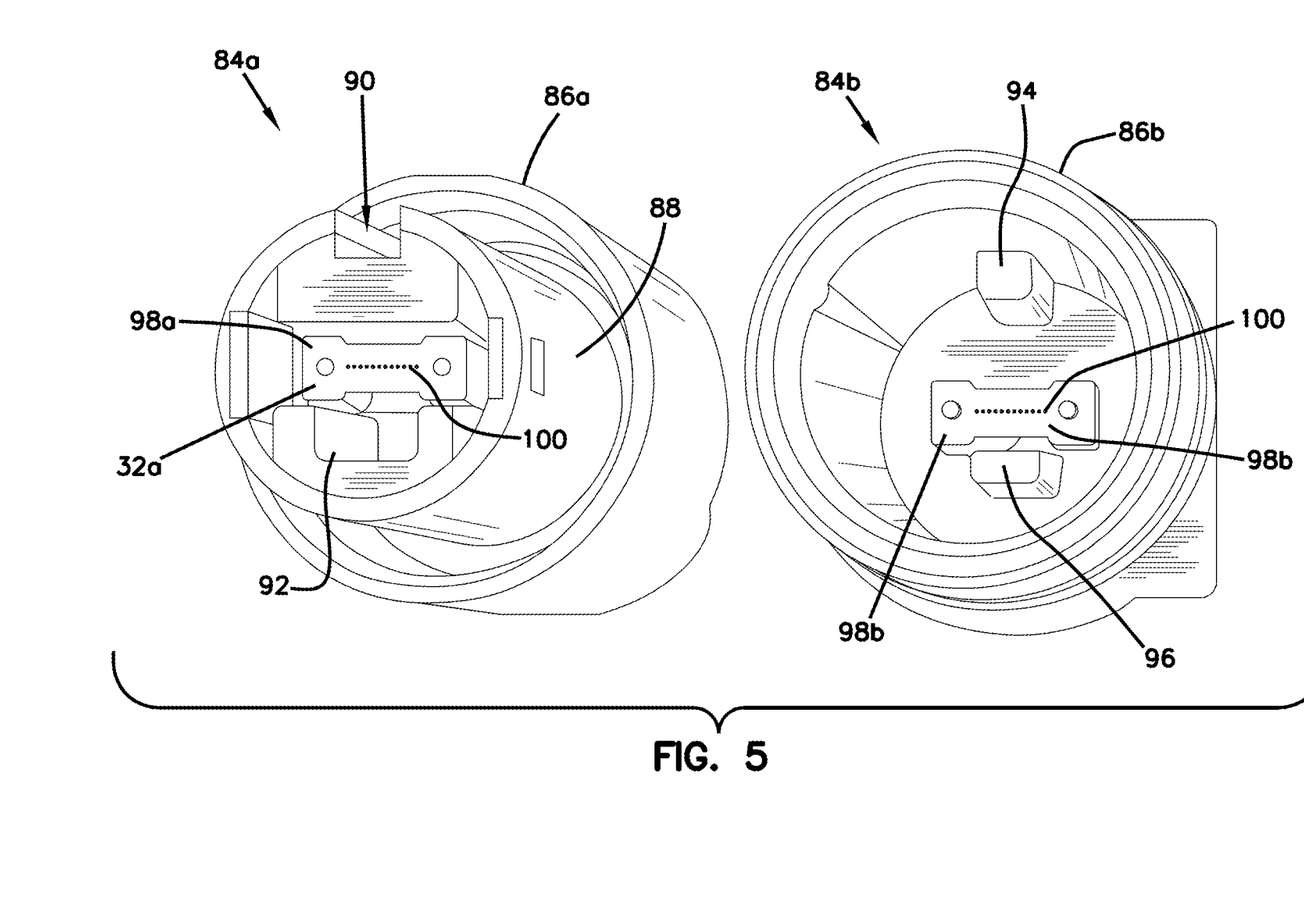
FIG. 5 is a perspective view of ruggedized multi-fiber connectors that can be used in systems and components of the present disclosure.

Turning to FIG. 5, example mating male and female HMFOC connectors 84a, 84b is depicted. The male and female connectors 84a, 84b include intermatable mechanical coupling interfaces. For example, the male connector 84a includes an internally threaded nut 86a that threads on a threaded portion 86b of the female connector 84b. Also, the male connector 84a includes a plug portion 88 with openings 90, 92 that mate with projections 94, 96 of the female connector 84b to provide alignment during coupling. The connectors 84a, 84b include ferrules 98a, 98b having fiber receiving arrangements that include fiber receiving positions 100 (e.g., a row of twelve fiber receiving positions) that align when the connectors 84a, 84b are mated to provide optical connections between the optical fiber supported by the ferrules 98a, 98b.

In accordance with the principles of the present disclosure, it will be appreciated that the gel 50 may be positioned on an end face 32a, 32b of at least one of the ferrules 98a, 98b of the HMFOC connectors 84a, 84b. In other examples, the gel 50 may be positioned on the end faces 32a, 32b of both the ferrules 98a, 98b of the HMFOC connectors 84a, 84b. Fiber tips of the optical fiber can extend through the fiber receiving positions 100 of connectors 84a, 84b. The fiber tips can be embedded in the gel 50 that is arranged and configured on the end face 32, 32b of the ferrules 98a, 98b. As the ferrules 98a, 98b are mated, the gel 50 can be compressed between the two end faces 32a, 32b of the ferrules 98a, 98b and may be dispersed within a shell (e.g., housing) of the connectors 84a, 84b. The gel 50 acting as a cleaning agent to wipe any dust or contamination off the fiber tips. Further details of example HMFOC connectors are disclosed at U.S. Pat. No. 7,264,402, which is hereby incorporated by reference in its entirety.

The terminals can also include hardened single fiber connectors (DLX). Hardened single fiber connectors can include environmental seals for sealing the connectors in outside environments. Hardened single fiber connectors can include fasteners such as threaded fasteners for providing robust connector-to connector mechanical connections. Hardened single fiber connectors can include male connectors on cables, female connectors on cables, ports/adapters on housings and other structures. Hardened single fiber connectors can include ferrules supporting single fibers. Further details about example hardened single fiber connectors and adapters are disclosed at U.S. Pat. No. 7,959,361, which is hereby incorporated by reference in its entirety.

The terminals can also include non-ruggedized connectors such as standard single fiber connectors (e.g., SC plugs, SC adapters, LC plugs, LC adapters, ST plugs, ST adapters, etc.) or standard multi-fiber connectors (e.g., MPO plugs and/or MPO adapters).

Figure 6:
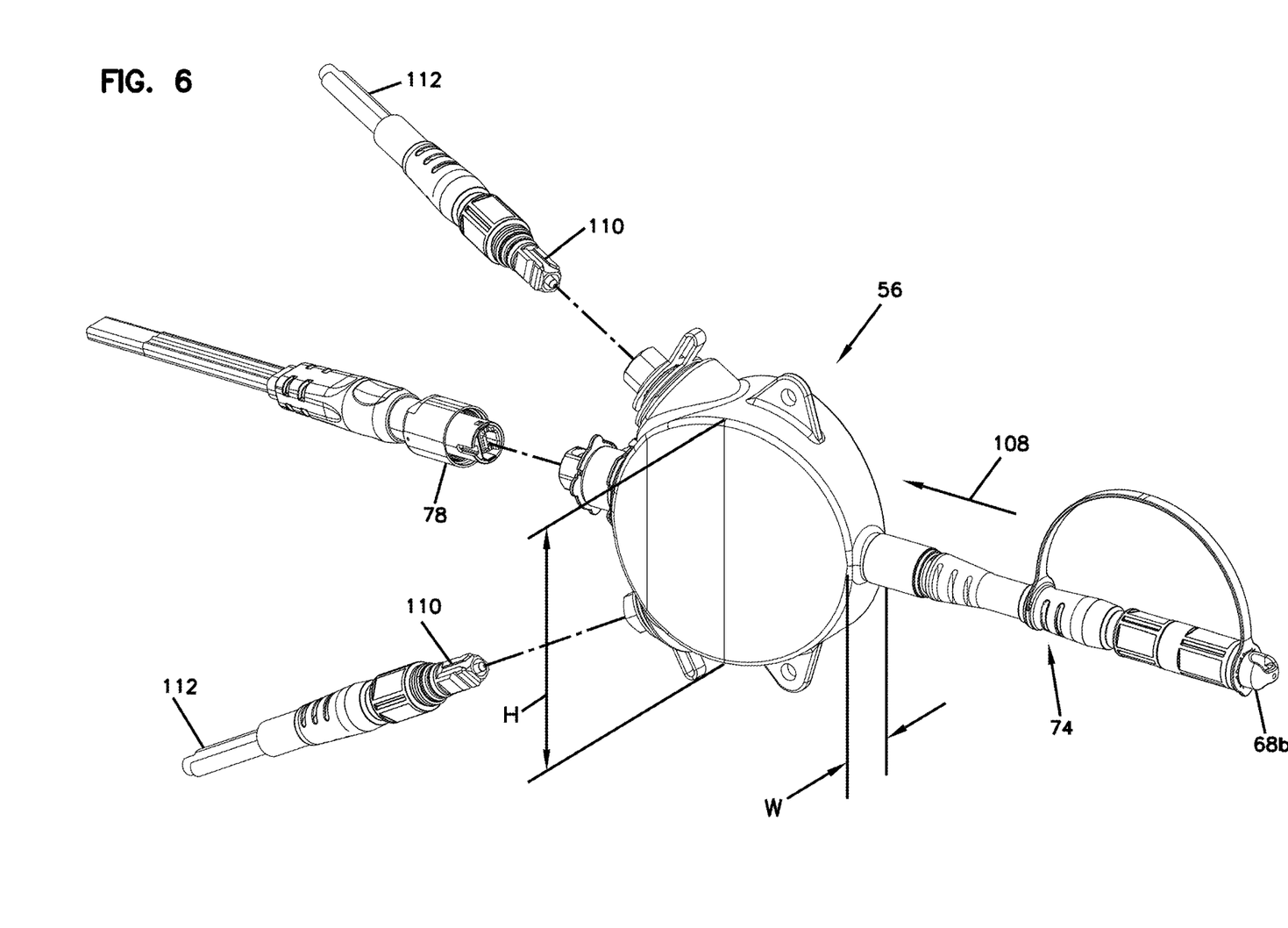
FIG. 6 is a side perspective view of an indexing terminal housing with dust caps removed from corresponding cables, which are shown offset from the indexing terminal housing.
Figure 7:
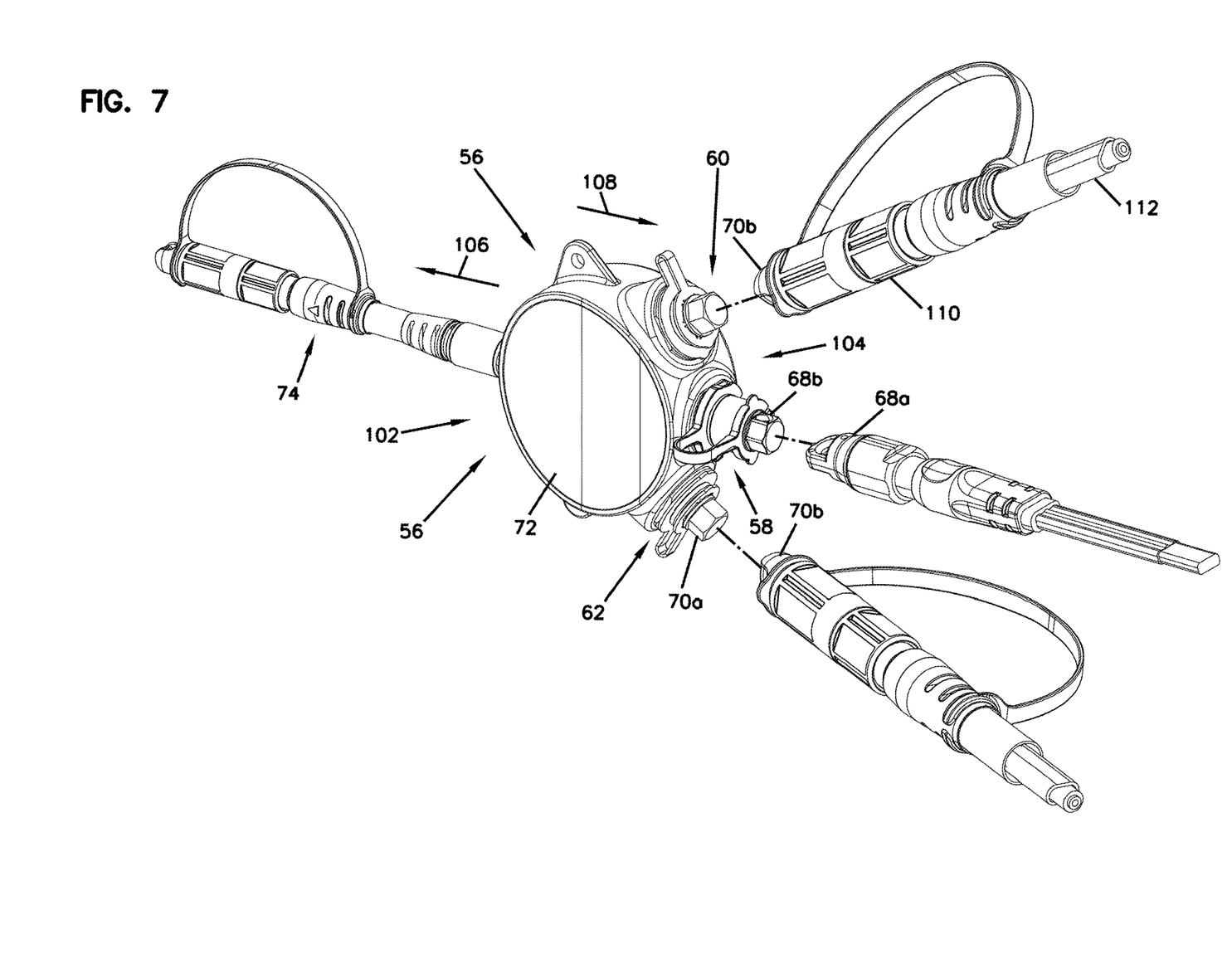
FIG. 7 is a second side perspective view of the indexing terminal housing of FIG. 6 except that the dust caps are disposed on the corresponding cables.

FIGS. 6-7 further depict one example indexing terminal 56 having a housing 72 with opposite first and second ends 102, 104. The tether 74 interfaces with the housing 72 at the first end 102 and extends outwardly from the first end 102 of the housing 72 in a first direction 106. The multi-fiber ruggedized de-mateable connection location 58, the first single-fiber ruggedized de-mateable connection location 60, and the second single-fiber ruggedized de-mateable connection location 62 are provided at the second end 104 of the housing 72.

Exterior ports of the multi-fiber ruggedized de-mateable connection location 58 faces in a second direction 108 that is diametrically opposite from the first direction 106. In some implementations, the first single-fiber ruggedized de-mateable connection location 60 and the second single-fiber ruggedized de-mateable connection location 62 face at least partially in the second direction 108. In certain examples, the first single-fiber ruggedized de-mateable connection location 60 and the second single-fiber ruggedized de-mateable connection location 62 can be angled relative to the multi-fiber ruggedized de-mateable connection location 58 to face only partially in the second direction.

In the example shown, the housing 72 includes opposite major sides interconnected by a generally cylindrical sidewall. The multi-fiber ruggedized de-mateable connection location 58, the first single-fiber ruggedized de-mateable connection location 60, and the second single-fiber ruggedized de-mateable connection location 62 are provided on the cylindrical sidewall. The tether 74 passes through the cylindrical sidewall.

The multi-fiber ruggedized de-mateable connection location 58 is defined by a ruggedized, multi-fiber adapter configured for receiving a ruggedized multi-fiber optical connector such as the ruggedized multi-fiber optical connector 78 of a like indexing terminal. The exterior port defined by the multi-fiber ruggedized de-mateable connection location 58 defines an interior diameter sized for receiving the ruggedized multi-fiber optical connector 78 of a like indexing terminal 56. The indexing gel 50 can be positioned on the ruggedized multi-fiber optical connector 78 to embed fiber end faces of the connector 78.

The first and second single-fiber ruggedized de-mateable connection locations 60, 62 can be defined by ruggedized fiber optic adapters. Such ruggedized fiber optic adapters can define internal diameters sized for receiving corresponding ruggedized fiber optic connectors 110 corresponding to cables such as cables 112. The ruggedized fiber optic connectors 110 can also have gel 50 positioned on fiber end faces in accord with the present disclosure.

Another aspect of the present disclosure relates to a multi-fiber optical connector assembly that includes a multi-fiber ferrule mounted at a multi-fiber connection interface. As previously described, the multi-fiber ferrule can have an end face that defines a plurality of fiber openings arranged in a central region of the end face. First and second alignment structures can be disposed at opposite sides of the central region and the multi-fiber ferrule can hold a plurality of optical fibers with fiber tips that protrude from respective fiber openings defined by the end face. The gel can be positioned at the end face of the multi-fiber ferrule to cover the fiber tips such that the fiber tips are embedded in the gel between the first and second alignment structures. A dust cap can be secured at the multi-fiber connection interface by a twist-to-lock interface. The dust cap can be removed such that the gel remains on the end face of the multi-fiber ferrule. In one example, the multi-fiber connection interface includes a port within a housing, although alternatives are possible. For example, the multi-fiber connection interface can include a fiber optic connector. The fiber optic connector can be a male connector or a female connector.

Figure 8:
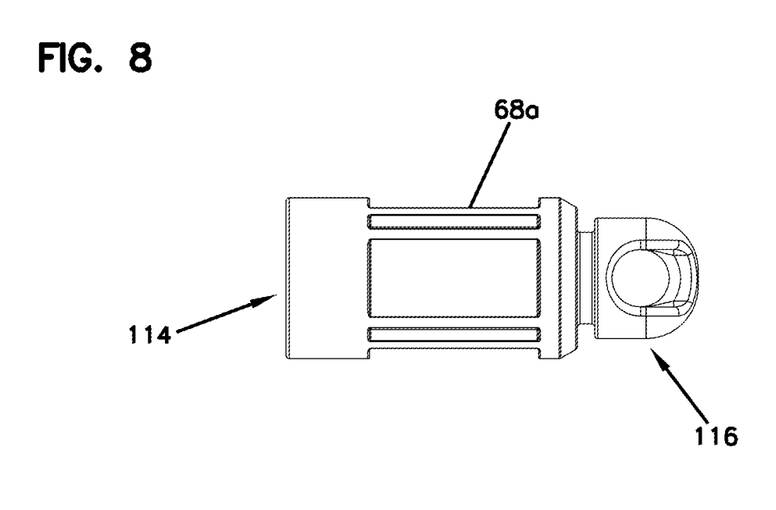
FIG. 8 is a side perspective view of the example dust cap shown in FIG. 7.

Turning to FIG. 8, the closed end 116 of the dust cap 68*a* can oppose the gel 50 positioned on any of the connectors described herein to secure the gel 50. For example, the gel 50 can be secured in place on the fiber end faces of the connector 78. The gel 50 can be recessed relative to the dust cap 68*a* such that the dust cap 68*a* does not contact the gel 50. As a result, the dust cap 68*a* can be removed without removing the gel 50 and the gel 50 can remain positioned on the fiber end faces of the connector 78. In one example, the dust cap 68*b* can be used to protect the gel 50 and the gel 50 can be recessed relative to the dust cap 68*b* such that the dust cap 68*b* does not contact the gel 50. The gel 50 can remain on the end face of the ferrule of the connector 78 when the dust cap 68*b* is removed.

In certain examples of the present disclosure, the dust caps have a ruggedized, environmentally sealed construction. In certain examples, the dust caps are secured to their respective ruggedized connection location by a twist-to-lock interface such as a threaded interface, a bayonet-style interface, or other interface.

From the forgoing detailed description, it will be evident that modifications and variations can be made without departing from the spirit and scope of the disclosure.

What is claimed is:

1. A multi-fiber optical connector assembly comprising:
a fiber optic cable terminated by a fiber optic connector arrangement, the fiber optic connector arrangement including:
first and second hardened multi-fiber optic connectors each having a connector housing, the connector housing of the first and second hardened multi-fiber optic connectors each having an end defining a plug portion;
a multi-fiber ferrule assembly respectively mounted at least partially within the connector housing of the first and second hardened multi-fiber optic connectors, the multi-fiber ferrule assembly including a multi-fiber ferrule located at respective plug portions of the connector housing of the first and second hardened multi-fiber optic connectors, each multi-fiber ferrule having an end face defining a plurality of fiber openings arranged in a central region of the end face, wherein first and second alignment structures are disposed at opposite sides of the central region, the multi-fiber ferrule of the first and second hardened multi-fiber optic connectors each holding a plurality of optical fibers, the plurality of optical fibers having fiber tips that protrude from respective fiber openings defined by the end face;
a main sleeve body mounted over a rear portion of the multi-fiber ferrule assembly of at least one of the first and second hardened multi-fiber optic connectors;
a fastener mounted over the main sleeve body for securing the first hardened multi-fiber optic connector to the second hardened fiber optic connector; and
a gel positioned at the end face of the multi-fiber ferrule of at least one of the first and second hardened multi-fiber optic connectors, the gel covering the fiber tips such that the fiber tips are embedded in the gel between the first and second alignment structures;
wherein the fiber tips of the plurality of optical fibers pass through the gel as the first and second hardened fiber optic connectors are mated together, the gel removing contaminates from the fiber tips of the plurality of optical fibers as the fiber tips move through the gel prior to mating the first and second hardened fiber optic connectors together; and
wherein a dust cap is mounted on the multi-fiber ferrule of at least one of the first and second hardened multi-fiber optic connectors, wherein the gel is recessed relative to the dust cap such that the dust cap does not contact the gel, and as the dust cap is removed, the gel remains on the end face.

2. The hardened multi-fiber optical connector assembly of claim 1, wherein each of the alignment structures can be either an alignment pin or an alignment hole.

3. The hardened multi-fiber optical connector assembly of claim 1, wherein the fiber tips pass through the gel prior to the first and second hardened fiber optic connectors being mated together.

4. The hardened multi-fiber optical connector assembly of claim 1, wherein the gel is attached to the first hardened multi-fiber optical connector or the second hardened multi-fiber optical connector.

5. The hardened multi-fiber optical connector assembly of claim 1, wherein the gel is dispersed within the connector housing of at least one of the first and second hardened multi-fiber optical connectors when mated together.

6. The hardened multi-fiber optical connector assembly of claim 1, wherein the multi-fiber ferrule is configured to hold at least about twelve optical fibers.

7. The hardened multi-fiber optical connector assembly of claim 1, wherein the fiber tips of the plurality of optical fibers protrude from the end face between about 3 microns to about 15 microns.

8. The hardened multi-fiber optical connector assembly of claim 1, wherein the dust cap has an open end and an opposite closed end, the closed end of the dust cap opposing the gel to secure the gel in place on the end face.

9. A multi-fiber optical connector assembly comprising:
a fiber optic cable terminated by a fiber optic connector arrangement, the fiber optic connector arrangement including:
a hardened multi-fiber optic connector having a connector housing, the connector housing having an end defining a plug portion;
a multi-fiber ferrule assembly mounted at least partially within the connector housing, the multi-fiber ferrule assembly including a multi-fiber ferrule located at the plug portion of the connector housing, the multi-fiber ferrule having an end face defining a plurality of fiber openings arranged in a central region of the end face, wherein first and second alignment structures are disposed at opposite sides of the central region, the multi-fiber ferrule holding a plurality of optical fibers having fiber tips that protrude from respective fiber openings defined by the end face;
a gel positioned at the end face of the multi-fiber ferrule that covers the fiber tips such that the fiber tips are embedded in the gel between the first and second alignment structures; and
a dust cap that mounts over the multi-fiber optic connector by a twist-to-lock connection, wherein as the dust cap is removed, the gel remains on the end face of the multi-fiber ferrule; and
wherein the gel is recessed relative to the dust cap such that the dust cap does not contact the gel.

10. The multi-fiber optical connector assembly of claim 9, wherein the twist-to-lock connection is a threaded connection or a bayonet-style connection.

* * * * *